United States Patent [19]

Roble

[11] Patent Number: 5,035,156

[45] Date of Patent: Jul. 30, 1991

[54] IGNITION KEY-BRAKE SWITCH INTERLOCK FOR A TRANSMISSION GEAR SELECTOR

[75] Inventor: Chester W. Roble, Livonia, Mich.

[73] Assignee: Ford Motor Company, Dearborn, Mich.

[21] Appl. No.: 432,257

[22] Filed: Nov. 6, 1989

[51] Int. Cl.⁵ .............................................. B60K 41/26
[52] U.S. Cl. ................................... 74/850; 70/248; 70/254; 74/878
[58] Field of Search ....................... 74/850, 878, 483 R; 180/271; 70/248, 254; 192/1.1

[56] References Cited

U.S. PATENT DOCUMENTS

| | | | |
|---|---|---|---|
| 4,473,141 | 9/1984 | Mochida | 192/1.1 |
| 4,660,443 | 4/1987 | Simancik | 74/878 |
| 4,724,722 | 2/1988 | Beauch et al. | 74/483 R X |
| 4,768,610 | 9/1988 | Pagel et al. | 180/271 |
| 4,854,193 | 8/1989 | Newman et al. | 70/248 X |
| 4,887,702 | 12/1989 | Ratke et al. | 74/878 X |
| 4,932,493 | 6/1990 | Sakurai et al. | 180/271 |

Primary Examiner—Leslie A. Braun
Assistant Examiner—Matthew Stavish
Attorney, Agent, or Firm—Frank G. McKenzie; Keith L. Zerschling

[57] ABSTRACT

An ignition key-brake interlock for a transmission gear shifter includes a gear and actuator having teeth in meshing engagement, a lever whose rotation is prevented or limited depending upon the position of the actuator, a pivotably mounted cam on a gear selector, a cable assembly connecting the ignition key lever to the cable and electrical solenoid through which the cable assembly passes, and a gear selector shaft movable by the vehicle operator among several gear range detent positions. An electrical power source is connected to the solenoid when the ignition switch is turned to run or start, and is disconnected when a brake pedal is depressed. A button, crimped to the cable, moves freely within the solenoid and into contact with plunger, which is magnetically held on a seat when the electric circuit is closed.

6 Claims, 3 Drawing Sheets

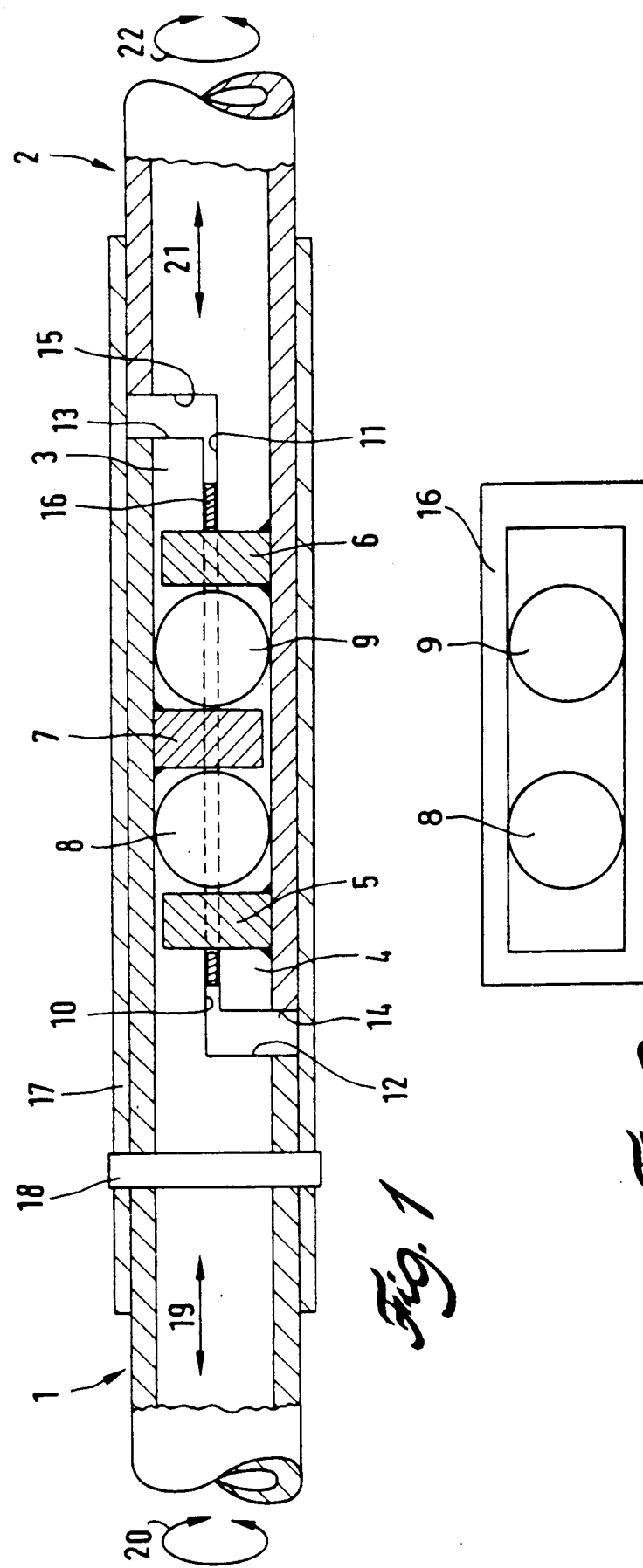

IGNITION KEY-BRAKE SWITCH INTERLOCK FOR A TRANSMISSION GEAR SELECTOR

BACKGROUND OF THE INVENTION

1. Field of the Invention

This invention relates to an ignition switch and brake interlock for controlling operation of a transmission gear selector.

2. Description of the Prior Art

Conventional ignition switch interlocks for transmission gear selectors prevent movement of the selector from the park position to any other position when the ignition switch is in a locked state or accessory state. The interlock prevents a gear shift from the park position except when the ignition switch is at the run or off position. An interlock of this type is described in the 1989 Car Shop Manual Published by Ford Motor Company. The effects of application and release of a foot brake pedal can be incorporated in the ignition key interlock so that the gear shift lever cannot be moved from the park position when the ignition switch is in the lock or accessory position, unless the brake pedal is applied.

In addition to the components of a conventional interlock system, an electrical solenoid is connected and disconnected from a circuit containing an electrical power source, in accordance with the applied and released state of the brake pedal. A steel cable passing through the solenoid connects a lever located adjacent the ignition switch and a pivoting cam located in the gear shift mechanism. The solenoid includes a movable plunger which is magnetically locked to the seat when the electric circuit is closed and released magnetically when the circuit is open. Generally in systems of this type, a solenoid plunger is fixed to the cable by crimping at a fixed location. When tension force is applied to the cable by attempted movement of the shift selector button, the button tends to force the plunger out of contact with the seat in opposition to the magnetic forces opposing this action.

SUMMARY OF THE INVENTION

Dimensional and assembly tolerances associated with the components of an interlock system are cumulative and must be considered when establishing the amount of engagement of the shift selector pawl with the surface of a detent plate. This engagement establishes the distance the gear selector pawl must move before free movement of the gear selector can be made from the park position. Tolerances to be considered, illustrated in FIG. 5, include tolerance associated with dimension C between the location of a button on the end of a cable adjacent a shift selector cam and the location of the axis of the pivot on which the cam turns. A second tolerance is associated with distance D between a surface on a cam plate where the cable assembly button contacts the cam and the centerline of the cam pivot. A third tolerance is associated with dimension A between the surface of an ignition key actuator and the top of an ignition lock cylinder housing in which the actuator is located. A fourth tolerance, dimension B, is associated with the location of the lever relative to the toP of an ignition lock cylinder housing.

These tolerances are cumulative and their sum is increased by the mechanical advantage or the multiple by which a gear selector pawl moves in relation to axial displacement of a cable assembly connected to the gear shift cam. The depth of the park position detent has a predetermined dimension and tolerance which must be compared to the sum of the cumulative tolerances to establish minimum engagement of the Pawl in the park detent. This dimension prevents inadvertent disengagement of the pawl from the park detent.

Accumulation of tolerances is minimized and certain of the tolerances are eliminated entirely in establishing the detent-pawl engagement dimension with the device according to the present invention. For example, tolerances associated with the brake interlock mode of operation are separated from tolerances associated with the key interlock mode. Only two tolerances, those associated with the distance from the center of the cam pivot to the cam surface on which the cable button seats and the location of the button on the cable, are additive. The other two tolerances are eliminated from the tolerance stack. Consequently the degree of engagement of the radially outermost edge of the parking pawl with the radially innermost edge of the detent surface that defines the parking detent recess is larger than the engagement realized by conventional techniques.

When the system of this invention is controlled in the key interlock mode, i.e., without the effect of the magnetic lock resulting from an energized solenoid, the tolerance associated with the key interlock lever relating to the top of the ignition switch housing is eliminated. Instead, the cable is attached to the lever with a button seated on the solenoid plunger using a gauge for which the tolerance is substantially zero. Therefore, in the key interlock mode of operation, the amount of assured engagement between the parking pawl and the parking detent edge is larger than in conventional systems.

BRIEF DESCRIPTION OF THE DRAWINGS

FIG. 1 is a schematic diagram of an interlock system to which this invention may be applied.

FIG. 2 is a cross section through principal components of the interlock system showing structural details.

DESCRIPTION OF THE PREFERRED EMBODiMENT

Figure 3:
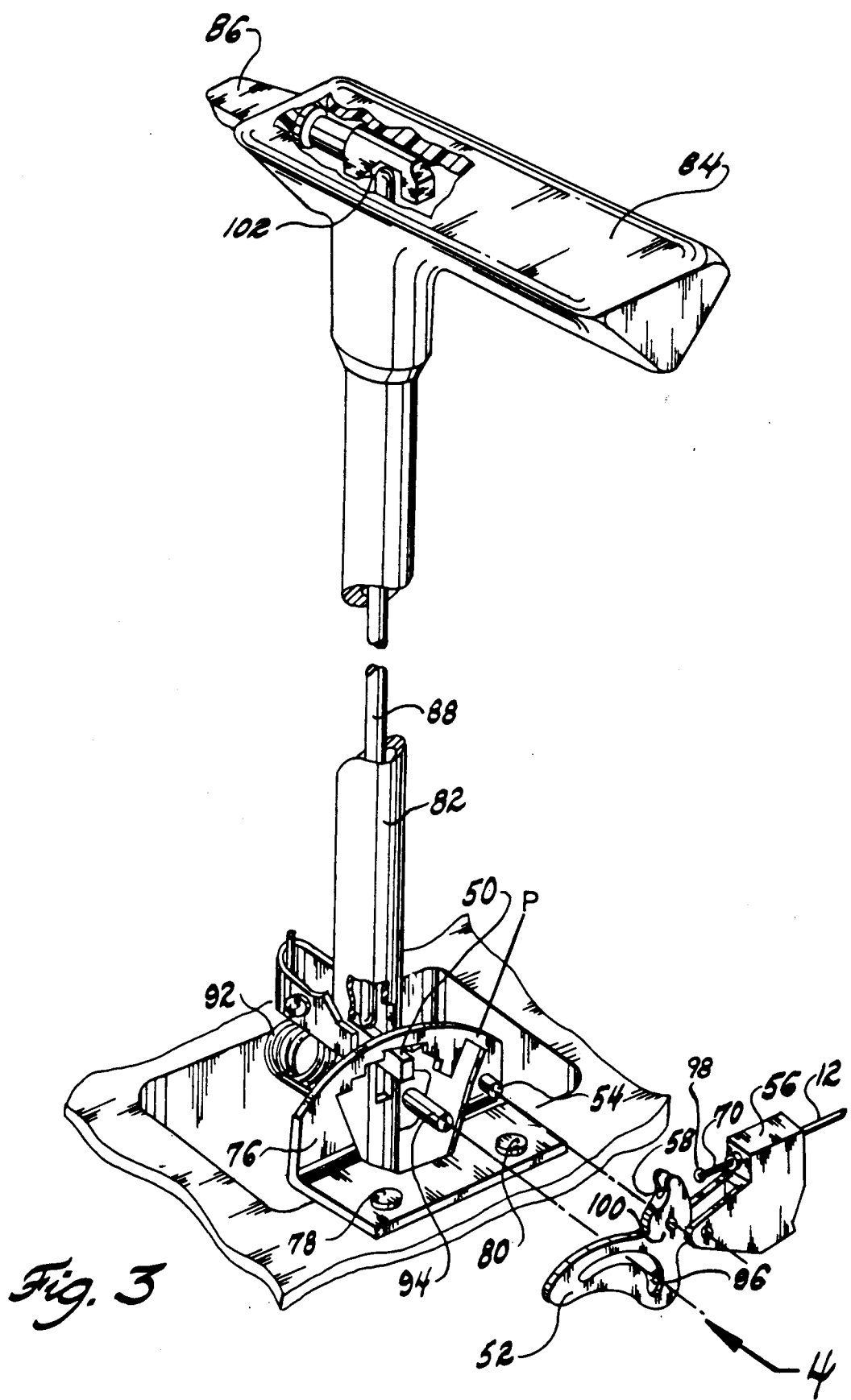
FIG. 3 is an isometric view showing details of the gear shifter.

Referring first to FIG. 1, an engine ignition switch and actuator 10 are connected by a cable assembly 12 to a transmission gear selector 14. The vehicle operator controls the state of the ignition switch and actuator by rotating an ignition key among several positions. The gear shifter is movable by the vehicle operator among several selectable transmission ranges by depressing a gear selector button 16 and rotating the position of the gear selector 14. An electrical solenoid 20 is selectively connected to an electrical power source 22 through operation of a switching device, such as a switch or microprocessor 24 supplied with several input signals 26, 27. Either switching device is subject to the applied and released state of a brake pedal or brake lever 28 actuated by the vehicle operator.

FIG. 2 shows an ignition switch gear 30 mounted within a housing 49 located on the steering column of a vehicle. A key is inserted into slot 32 before starting the engine or using the accessories. The ignition key is moveable among the following positions spaced angularly about the axis of the gear: accessory (ACC), lock (L), OFF, run (R), and start (S). To start the ignition the key is rotated clockwise to the S position and then released for counterclockwise rotation by a spring actuator to the R position. The vehicle accessories can be operated when the key is rotated to the extreme counterclockwise position, but the key can be removed from the ignition switch only when moved to the L position. When the key is located in the OFF position, the gear selector can be moved from a PARK position even if the brake is not actuated by the vehicle operator.

Gear 30 continually meshes with the teeth 34 on an ignition switch actuator 36 so that, when the key is rotated clockwise within the switch, the actuator moves rightward and, when the key is rotated counterclockwise, the actuator moves leftward. Lever 38, pivotally supported at 40, includes a first arm connected to cable assembly 12 at a first attachment 42, and a second arm contacting the upper surface of actuator 36. Contact between the foot of the second arm and the surfaces of the actuator determines, in accordance with the position of the key, whether lever 38 can rotate. When the ignition key is rotated clockwise from the OFF position, rotation of lever 38 is prevented by interference with surface 48, but when the ignition key is rotated counterclockwise sufficiently far so that surface 44 is moved below the lever arm, rotation of the lever is permitted.

At the right-hand side of FIG. 2, gear selector 14 is shown to include a pawl 50 and a cam 52, pivotally supported at 54 with bracket 56. The opposite end of the cable assembly from the end at first attachment 42 is connected to the cam at a second attachment 58.

Solenoid 20 includes a seat, fixed in position within the coil of the solenoid, and plunger 62, located adjacent the seat. A light compression spring 64 urges the plunger into contact with the seat, yet the spring permits displacement of the plunger away from the seat. The seat and plunger define a coaxial bore 66, and the plunger includes a smaller diameter bore 68. Through each of these bores 66, 68 a steel wire 70 passes from its connection at attachment 42 on lever 38 to attachment 58 on cam 52. Fixed to the steel wire by crimping is a button 72 having a head seatable on the surface at the right-hand extremity of bore 67. The button includes an axially directed hole through which wire 70 passes. The button and steel wire are free to move within bore 66 and 67 subject to the restraint of cable movement and to the button becoming seated on the plunger when it moves to the right-hand extremity of bore 67.

The cam is illustrated in FIG. 3 in its installed position. There, the cable assembly conduit 12 is shown fixed to bracket 56 and in position to be supported by the cam on pin 54.

A detent plate 76 is fixed by bolted attachments 78, 80 to a mounting bracket and ultimately to the chassis of the vehicle. A pawl 50 moves among several detent positions, among which the gear selector shaft 82 is moved by the vehicle operator in the process of selecting operating ranges for the transmission. The upper ends of the gear selector shaft 82 is fitted with a handle 84 and a detent release button having an inclined surface 102 held in contact with the upper end of rod 88. When the button is depressed the rod moves downward against pawl 50. Shaft 82 is supported pivotally at 90 and the pawl is biased upward by spring 92 into contact with the detent surfaces on plate 76.

Figure 4:
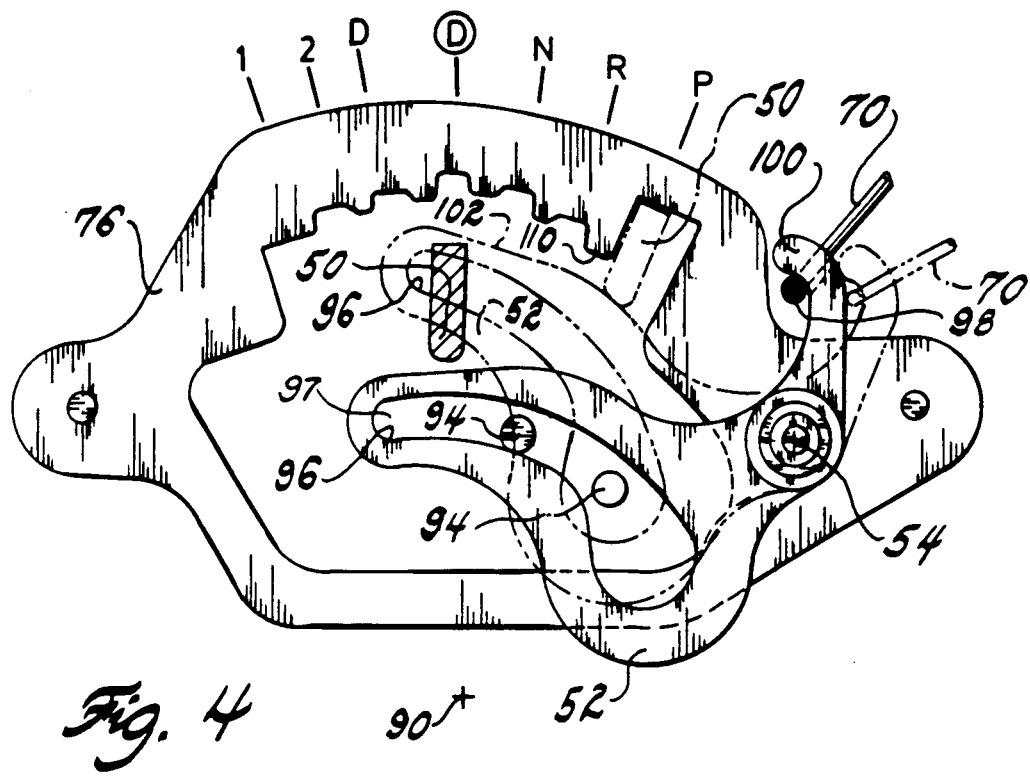
FIG. 4 is a front view of a detent plate pawl, and cam.
Figure 5:
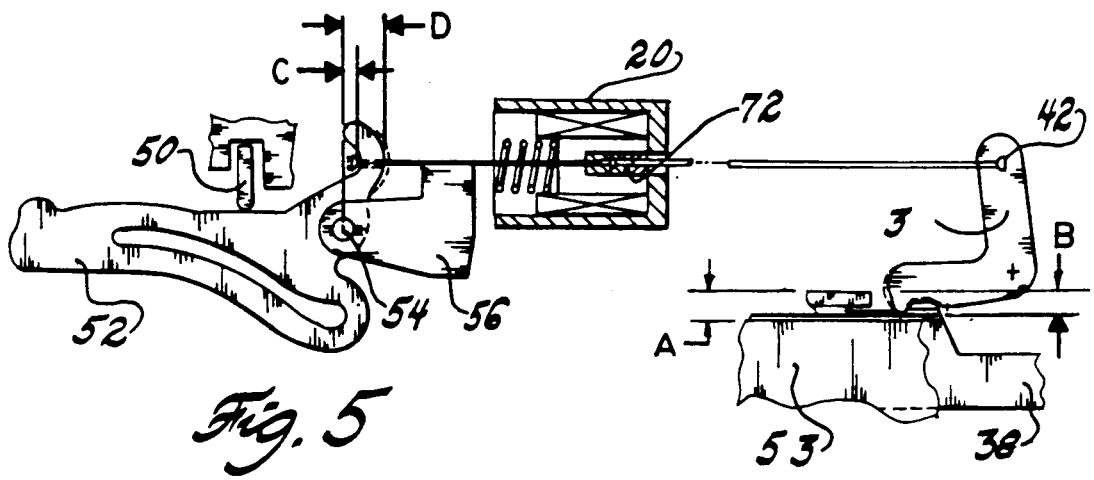
FIG. 5 is a schematic diagram of the interlock system and dimensional tolerances that affect gear selector engagement.

Cam plate 52 is supported pivotally on pin 54 and its rotation about the axis of the pin is guided by locating a guide pin 94 within slot 96, formed through the thickness of the cam plate. The end of cable 70 is fixed to the cam by a button 98, fixed to the cable by crimping and seated near the end of an arm 100, through which a slot is formed to receive the cable therethrough. When the vehicle operator depresses button on the handle the selector shaft, pawl 50 moves downward against cam surface 102, causing the cam to rotate about pin 54 subject to the guiding effect of pin 94 and slot 97. When the pawl 50 clears surface 110 on the detent plate, it can be moved to any of the other transmission operating range positions, shown in FIG. 4: P, R, N, OD, D, 2 and 1. When the gear selector is moved into angular alignment with any other range position, button 86 is released, rod 88 is forced upward, and the pawl becomes seated on the detent surface corresponding to the selected range position. As the cam pivots about pin 54, the position of second attachment 58 rotates to a position tending to pull cable 70 toward the gear selector and away from the solenoid and the key interlock.

When the ignition key is moved to the ACC, L and OFF positions, the solenoid is deenergized, but when the ignition key is in the R or S position, the solenoid is energized. When the ignition key is turned to the ACC or L position, surface 48 of actuator 36 moves to a position of interference with the foot of lever arm 38, thereby preventing rotation of the lever and movement of the cable assembly toward the solenoid and gear shifter. When the solenoid is energized, plunger 62 is held in contact with seat 60 by the effect of a magnetic field created by current circulating in the solenoid. When the solenoid is deenergized, only the light force produced by compression spring 64 urges the plunger toward contact with seat 60. This force can be easily overcome when the gear selector moves away from the PARK range position.

In operation when the ignition is locked and the gear shifter is located in the PARK position, cable 70 is in a state of tension produced by a torsional spring located at pivot point 42 of lever 38. Interference between the foot of lever 38 and actuator 36 prevents rotation of cam 52, even if the vehicle operator attempts to depress button 86. In this condition the gear shifter cannot be moved from the PARK position nor cam 52 rotate about pin 54 because tension in cable 7 prevents rotation of cam 52 and displacement of pawl 50 from the park detent.

When the ignition key is moved to the R or S position, actuator 36 moves rightward to allow rotation of interlock lever 38, but solenoid 20 is energized unless brake pedal 28 is depressed. When the solenoid is energized by turning the key to the R or S position, plunger 62 is held magnetically in contact with seat 60, thereby maintaining tension in the cable, and preventing rotation of cam 52 and displacement of pawl 50 from the park detent position. Therefore, with the brake pedal released and the ignition key in the R or S position, the gear selector cannot be moved from the PARK position.

When the brake pedal is depressed the circuit of FIG. 1 is open and solenoid 20 deenergized to allow plunger 62 to move away from seat 60. When button 86 is depressed, rod 88 moves downward against the pawl forcing it against surface 102 of cam 52. This causes the cam to rotate clockwise about pin 54, to the position shown in FIG. 4, sufficiently far so that the pawl clears detent surface 110. Thereafter, the gear selector can be moved readily among any of the other transmission range positions.

After the engine is started and the ignition key released from the S position, the key moves automatically to the R position where it remains until moved by the vehicle operator. When the ignition switch is in the R position, the solenoid is energized, but it is deenergized whenever the brake pedal is depressed. The system produces no sound because there are no moving parts. While the gear shifter is in any of the transmission range positions other than PARK and the ignition key is in the R position, the key cannot be rotated to the lock position because actuator 36 is blocked by interference with the foot of lever 38. However, when the gear selector is moved to the PARK position from a non-PARK position, plunger 62 contacts seat 60 and again prevents a shift from the PARK position unless the brake pedal is again depressed.

When the gear selector is in a non-park position, the position of cam 52 forces the cable away from the solenoid and brings button 72 to a seated position on the plunger. Therefore, when the gear selector is in a non-PARK position, plunger 62 is prevented from contacting seat 60 although the magnetic force resulting from the energized state of the solenoid urges the plunger toward the seat. The presence of button 72 on the bore of the plunger holds the plunger away from the seat and prevents normal shifting movement of the gear selector among the transmission range positions.

Installation of the interlock system begins by connecting, at attachment 42, cable 70 to lever 38, which is supported pivotably within interlock housing 49. A portion of conduit 12 is connected to the end of the housing and the cable is fed through that portion of the conduit. Then solenoid 20 is slipped over the cable from its free end and arranged so that the larger bore of the plunger is directed toward the housing. Next button 72 is fixed to the cable by crimping within about 1 mm. of a reference location. The final component of the interlock cable assembly, the portion of the conduit extending from the solenoid to the gear selector is slipped over the free end of the cable and crimped to the solenoid.

The final dimensions of the installation are established next. First, the solenoid is energized electrically to force plunger 62 into contact with seat 60. Concurrently a tension force of about 15 lbs is applied to the free end of the cable. Then a gauge is used to set the dimension from the center of the hole on bracket 56 at pivot pin 54 to the surface of the button that contacts cam 52 at attachment 58. That button 98 is crimped in position at the gauged location. The dimension of the gauged location of that button is chosen such that, in all tolerance conditions of cam plate 52 and button 98, the plunger 62 will not be pulled apart from seat 60.

Next, to assure that the plunger and seat make contact and that the cable will not cause button 72 to pull the plunger and seat apart, while the solenoid is energized, the foot of lever 38 is brought into contact with a reference or gauge surface located at a predetermined distance from the bottom of housing 49 where housing 49 is joined to the ignition lock cylinder housing located on the steering column. The length of portion 13 of the conduit is adjusted to hold the gauged location of button 48 at the previously set distance from the button surface that contacts cam 52 to the center of the hole on bracket 56 that receives pivot pin 54. Then the conduit portion 13 is crimped to the solenoid. This action establishes the position of button 72 at a position which ensures proper function of the cable assembly in both brake interlock and key interlock modes. Button 72 substantially contacts the plunger, yet its location ensures that the plunger and seat are in contact and not separated during brake interlock operation.

Finally the interlock, so set, is installed by a screw inserted in hole 51 to engage threads formed in the lock cylinder housing. The hole of bracket 56 is fitted over pivot pin 54, and the cable is attached to cam 52.

Because contact between the plunger and seat is absolutely ensured, this technique of assembly and installation removes tolerances associated with dimensions A and B from consideration when determining the amount of engagement of pawl 50 in the PARK detent in the brake interlock mode.

Otherwise, if button 72 were fixed to the cable with the plunger seated and without providing a space, such as the large bore in the plunger, to permit the button to move relative to the plunger without pulling the plunger out of contact with the seat, then tolerances on dimensions A and B would add to others to increase the tolerance stack up. Here, the brake interlock pawl-detent engagement must take into account only tolerances on dimensions C and D. The device and technique of this invention, therefore, disassociates tolerances of the key interlock operating mode from tolerances of the brake interlock mode.

Having described the preferred embodiment of my invention what I claim and desire to secure by U.S. Letters Patent is:

1. An ignition key-brake interlock for a motor vehicle transmission gear shifter, comprising:
    an ignition switch lever moveable between first and second operating states, having a first attachment moveable between first and second positions;
    a cable connecting the first attachment to a second attachment moveable among positions representing selectable ranges in which the transmission operates;
    an brake actuator for applying and releasing a brake;
    interlock means for preventing movement of the first attachment from a first position when the ignition switch lever is in a first state, and for permitting movement of the first attachment from the first position when the ignition switch lever is in a second state;
    switching means having an input connected to a source of electrical power and having an output, for opening and closing an electrical connection between said input and output in response to the state of said brake actuator;
    a solenoid connected to the output of the switching means, having an immovable seat, and a plunger fixed to the seat and released from the seat in accordance with the state of the switching means; and
    means connected to the cable and adapted to contact the plunger, for moving the plunger away from the seat when the solenoid is deenergized and the cable moves from the first attachment toward the second attachment, and for permitting relative movement between the cable and plunger when the cable moves from the second attachment toward the first attachment.

2. The interlock of claim 1 wherein:

the ignition switch lever includes a pivotably supported ignition switch lever having a first leg and a second leg, said legs extending radially from said support, the first attachment being located on the second leg; and the interlock means includes a moveable actuator having first and second mutually spaced surfaces contacting the second leg adapted to move the first attachment between said first and second positions as the actuator moves.

3. The interlock of claim 2 further including:

a gear selector including a pawl, detent recesses among which the pawl is selectively moveable; and a pivotably supported cam connected to the cable at the second attachment, contacted by the pawl, adapted to raise and lower the pawl within the detent recesses in accordance with the position of the second attachment.

4. The interlock of claim 1 wherein the cable passes through the solenoid, the plunger and seat have coaxial bores along which the cable moves as the first and second attachments move, the bore of the plunger defining a stop surface, and wherein the moving means includes:

a button fixed to the cable, located inside the solenoid and moveable in said bores, adapted to contact the stop surface thereby moving the plunger away from the seat and to move with respect to the plunger toward the seat, as the first and second attachments move.

5. The interlock of claim 3 further comprising:

a interlock housing on which the ignition switch lever is pivotably supported;

first conduit through which the cable extends, connecting the solenoid and the interlock housing; and a second conduit through which the cable extends, including a bracket having a hole for attaching the second conduit to the pivotable support of the cam.

6. An ignition key-brake interlock for a motor vehicle transmission gear shifter, comprising:

first actuating means moveable between first and second operating slates, having a first attachment moveable between first and second positions;

a cable connecting the first attachment to a second attachment moveable among positions representing selectable ranges in which the transmission operates;

a brake actuator for applying and releasing a brake;

first interlock means for preventing movement of the first attachment from a first position when the first actuating means is in a first state, and for permitting movement of the first attachment from the first position when the first actuating means is in a second state;

second interlock means for preventing movement of the second attachment from a predetermined range position provided the brake is released, and for allowing movement of the second attachment from the predetermined range position provided the brake is applied; p1 means connected to the cable for allowing adjusting movement of the second attachment in the predetermined range position while the brake is released;

switching means having an input connected to a source of electrical power and having an output, for opening and closing an electrical connection between said input and output in response to the state of said brake actuator;

a solenoid connected to the output of the switching means, having an immovable seat, and a plunger fixed to the seat and released from the seat in accordance with the state of the switching means, the plunger and seat having coaxial bores along which the cable moves as the first and second attachments move, the bore of the plunger defining a stop surface; and a button fixed to the cable, located inside the solenoid and moveable in said bores, adapted to contact the stop surface, thereby moving the plunger away from the seat and to move with respect to the plunger toward the seat, as the first and second attachments move.

* * * * *